INVENTORS
JOHN W. ROSS
ALFRED W. MARNER, JR.
BARRY C. MILLAR

United States Patent Office 3,306,116
Patented Feb. 28, 1967

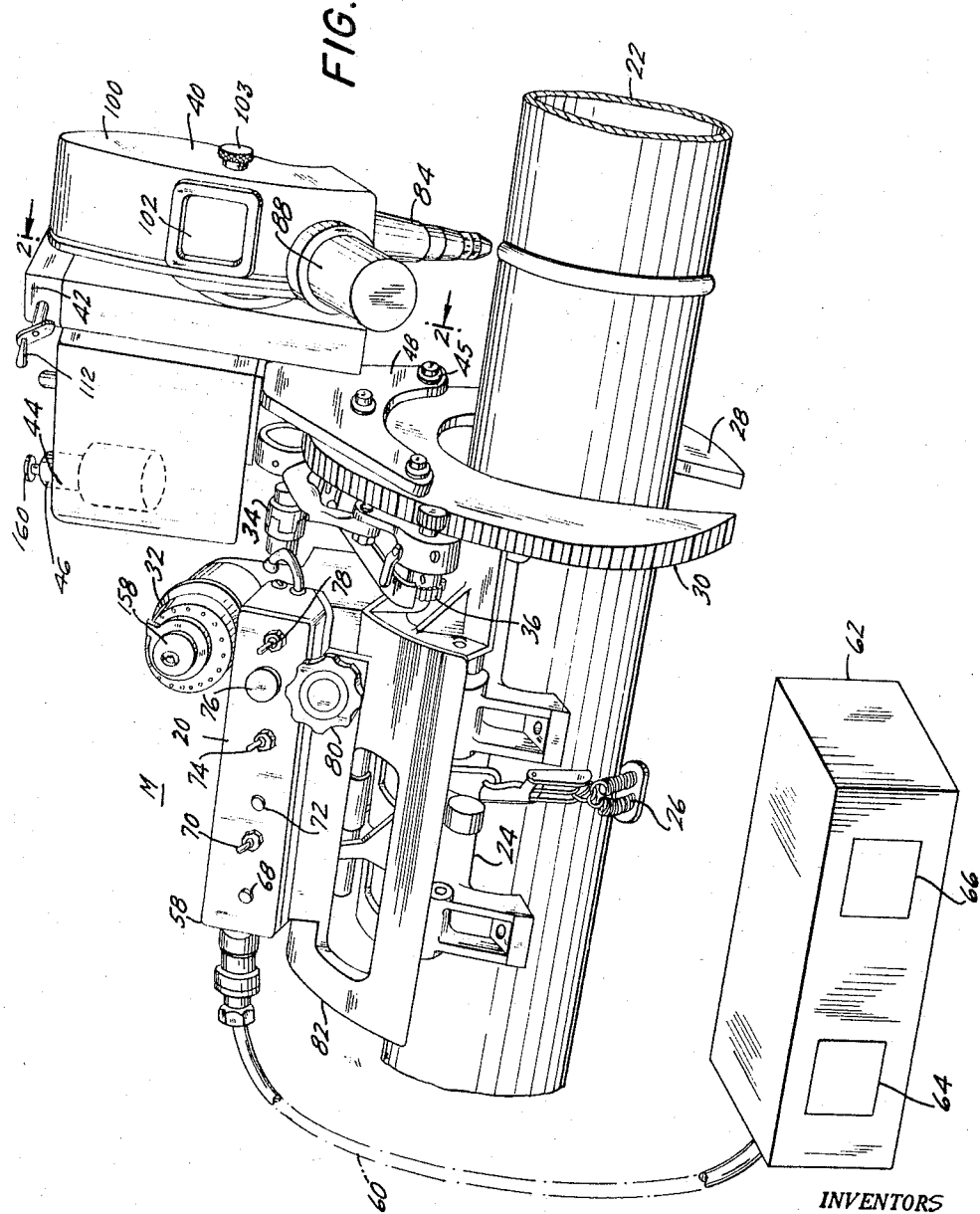

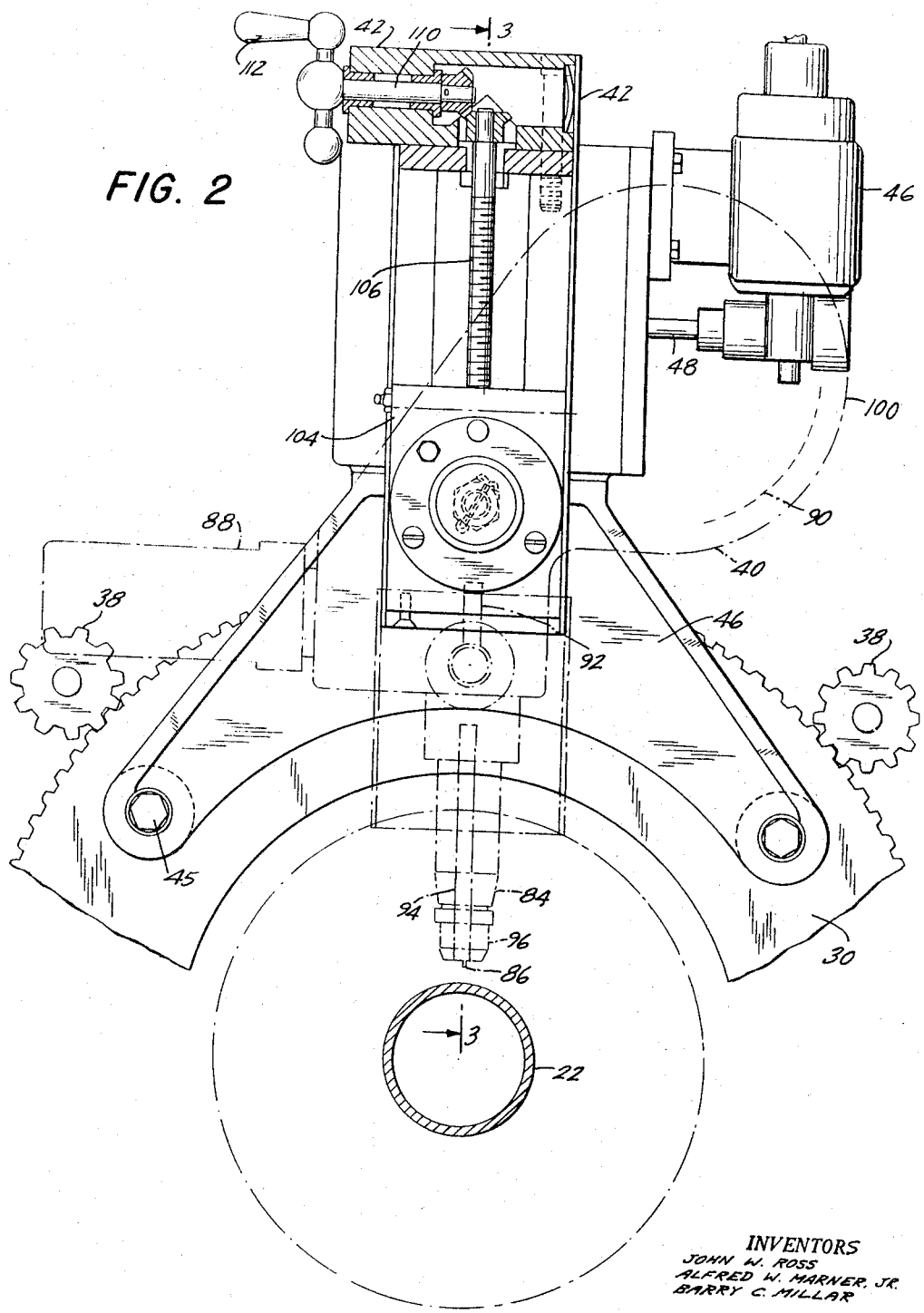

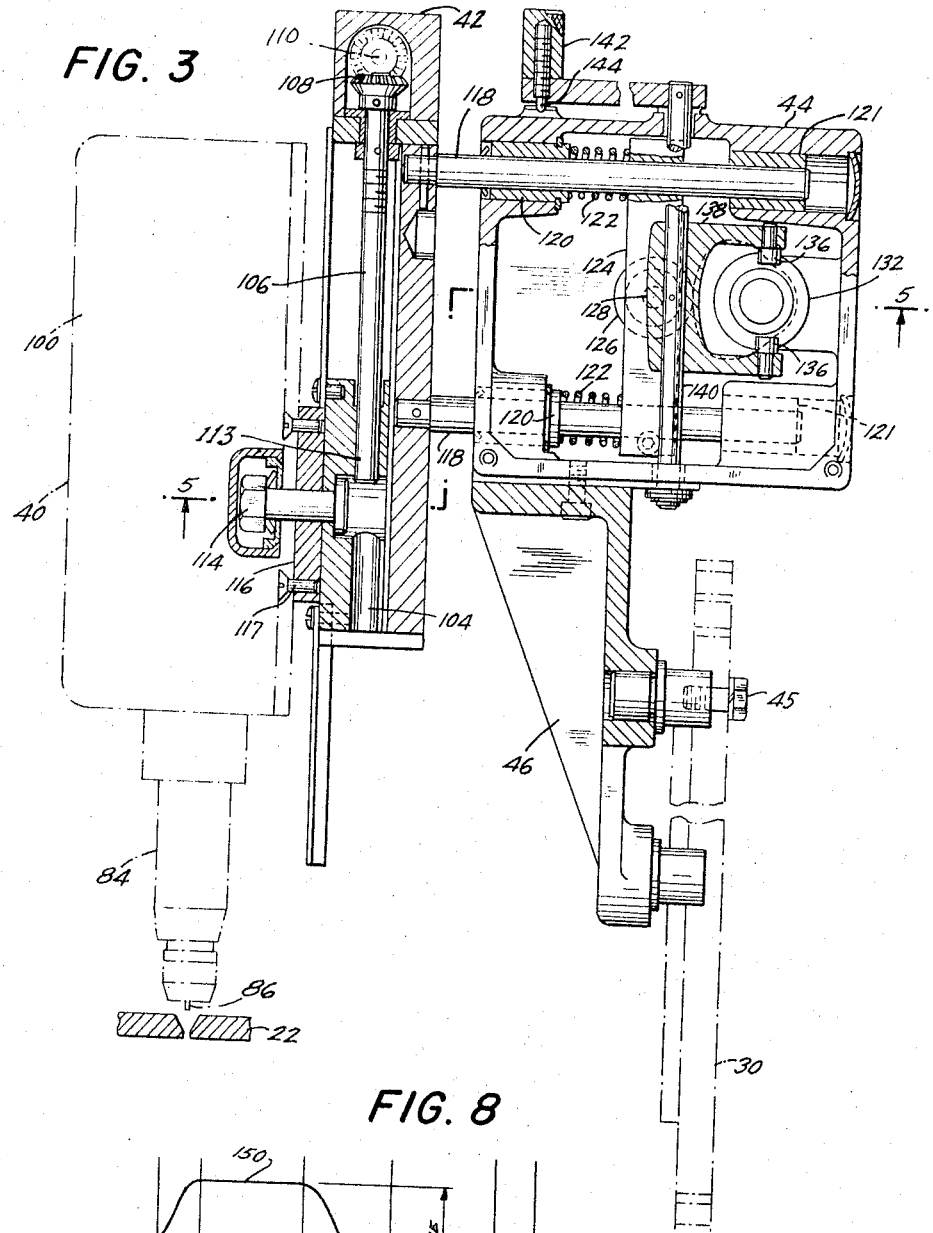
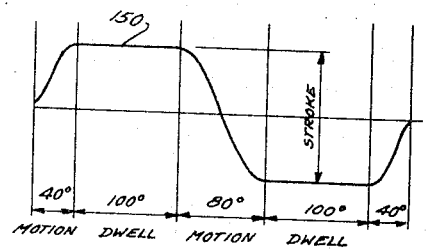

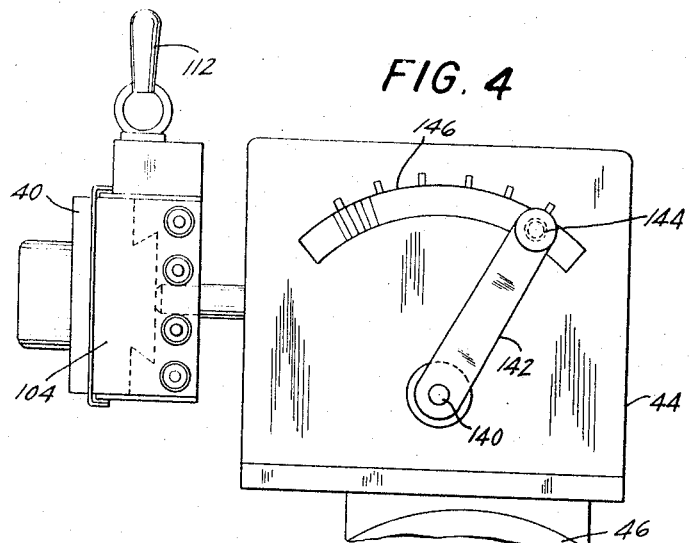
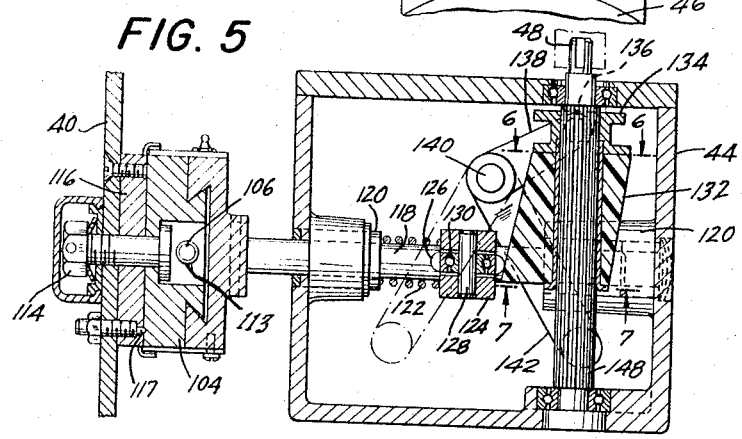
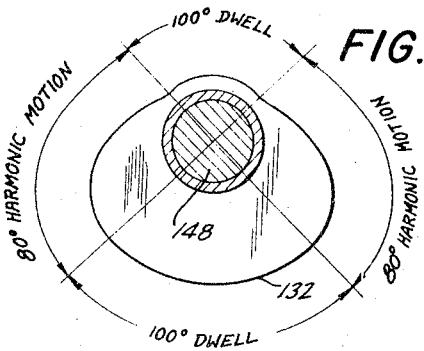
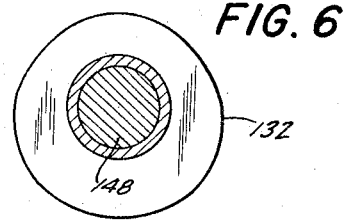

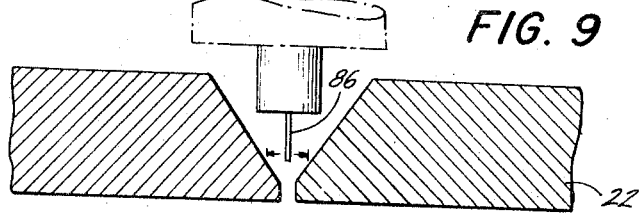
FIG. 9
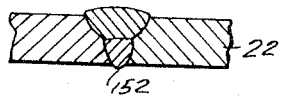
FIG. 11
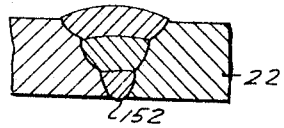
FIG. 12
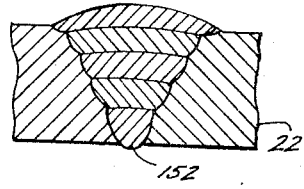
FIG. 13
| PASS | OSCILLATION AMPLITUDE | OSCILLATION APPROX. REVS. PER. MIN. | APPROX. WELDING SPEED PER. MIN. |
|---|---|---|---|
| ROOT | 1/8" | 200-250 | 9-10 |
| 1ST INTERMEDIATE | 1/4" | 80-90 | 9-10 |
| 2ND INTERMEDIATE | 3/8" | 70 | 8-10 |
| 3RD INTERMEDIATE | 7/16" | 60 | 6-7 |
| COVER | 1/2" | 40-45 | 5-6 |
FIG. 14
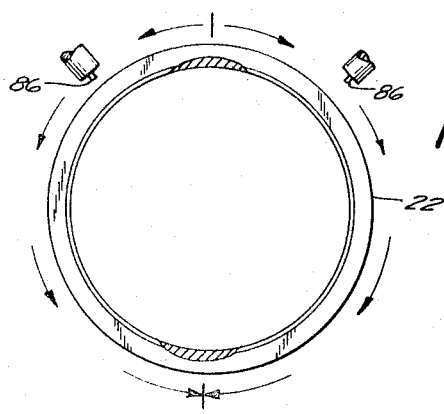
FIG. 10
INVENTORS
JOHN W. ROSS
ALFRED W. MARNER, JR.
BARRY C. MILLAR

3,306,116
WELDING TORCH OSCILLATOR UNIT
John W. Ross, Toronto, Ontario, Canada, Alfred W. Marner, Jr., Linden, N.J., and Barry C. Millar, Toronto, Ontario, Canada, assignors to Union Carbide Canada Limited, Toronto, Ontario, Canada, a corporation of Canada
Original application Apr. 8, 1961, Ser. No. 103,771, now Patent No. 3,179,781, dated Apr. 20, 1965. Divided and this application Mar. 17, 1965, Ser. No. 440,645
5 Claims. (Cl. 74—55)

This application is a division of U.S. application Serial No. 103,771 filed April 8, 1961, now U.S. Patent No. 3,179,781 issued on April 20, 1965 (hereafter referred to as the "other application").

This invention relates to work-in-circuit arc welding and more particularly to a torch oscillator unit for oscillating the electric welding arc.

The invention of the other application provides a novel process and machine for making code quality welds in steel pipe quickly, efficiently and with more uniformly higher quality than was possible prior thereto. This is accomplished mainly by the combination of novel critical transverse oscillation of a flux-free short-circuiting type sigma (shielded-inert-gas-metal-arc) consumable wire electrode, especially during the root pass. Such critical transverse oscillation is such that effective penetration of the weld by virtue of complete fusion with the base metal is obtained, as well as elimination of undercutting and improvement in the weld bead contour. Essentially, this is obtained by a critical dwell of the consumable wire electrode at each side of the joint for a sufficient period for electrode metal to be deposited and fused with the base metal as well with the metal of preceding weld passes.

An object of the present invention is to provide means for oscillating a sigma welding unit of a machine for work-in-circuit flux-free electric arc welding horizontally positioned steel pipe as disclosed in the other application. Reference is made to the other application for a disclosure and understanding of the welding process and welding machine in which the torch oscillator unit of this divisional application is used.

The sigma welding unit includes means for feeding a wire electrode radially of the pipe toward such joint, means for discharging a stream of arc-shielding gas composed of a mixture of $CO_2$ and argon around in the same direction as such electrode, and means for conducting welding current to the electrode wire as it is so fed toward such joint. Means supported by the pipe being welded is provided for guiding said unit arcuately in either direction along a path concentric with the axis of such pipe. A motor is connected to drive said unit in such path in a selected direction at a preselected speed that is adjustable. Means for oscillating said welding unit transversely with respect to such path as the unit travels therealong with the critical dwell of the arc on either side of the joint, includes a cam and a cam follower one of which is adjustable to change the amplitude of such oscillation, an oscillator-motor connected to drive said cam, and means for adjusting the speed said oscillator motor to change the frequency of such oscillation. The electrode wire is "inched" into contact with a 12 o'clock tack-weld to start a root pass in such joint which is fully penetrated by the oscillation of the electrode wire from one side to the other in the open V-joint as the unit travels from such 12 o'clock to a 6 o'clock position. The cam has a shape such that the wire electrode oscillates rapidly across the joint but dwells at a selected angle of between 60° and 150° of each cam revolution at either side thereof. As a result good side-wall fusion is assured, as well as concave weld-head contour in such root pass to provide a weld base of welding code quality in such joint for such subsequent filler weld passes as may be needed to fill the joint.

In the drawings:

FIGURE 1 is a fragmentary perspective view of a pipe welding machine illustrating the oscillator unit in relation to the machine.

FIGURE 2 is an enlarged fragmentary cross section of the machine taken on line 2—2 of FIGURE 1.

FIGURE 3 is a fragmentary view in section taken on line 3—3 of FIGURE 2.

FIGURE 4 is a top plan view of the oscillation amplitude controller.

FIGURE 5 is a fragmentary view of such controller in cross section taken on line 5—5 of FIGURE 3.

FIGURE 6 is a cross sectional detail taken on line 6—6 of FIGURE 5.

FIGURE 7 is a similar view of the cam taken on line 7—7 of FIGURE 5.

FIGURE 8 is a graphical representation of one oscillating cycle of the wire electrode in making a weld pass.

FIGURE 9 is an enlarged fragmentary cross sectional view illustrating the transverse oscillation of the welding head in making root passes according to the invention.

FIGURE 10 is a fragmentary cross sectional view of the tack welded joint between the pipe sections to be welded, showing how the welds are carried downwardly in each case on each arcuate half of the pipe.

Figure 15:
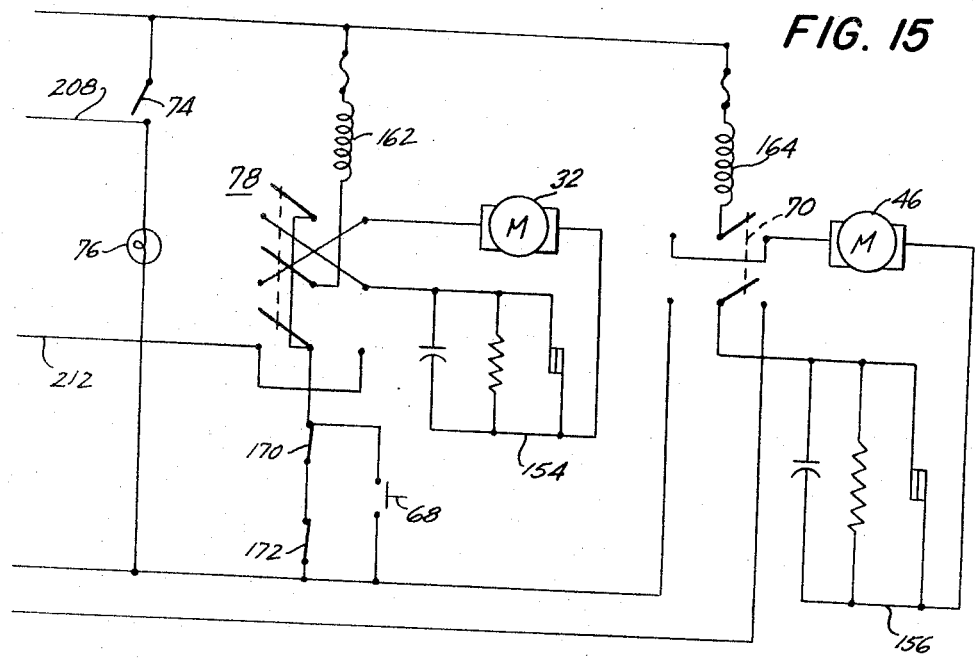

FIGURES 11, 12 and 13 are fragmentary cross sectional views of pipe of different wall thicknesses welded according to the invention with 2, 3 and 5 passes, respectively.

FIGURE 14 is a table of welding conditions for making the various weld passes of FIGURES 11–13.

FIGURE 15 is a circuit diagram of that part of the electrical system relating to welding pass rotation and oscillation.

As shown in FIGURE 1, the welding machine M is mounted on a pipe 22 which is in a substantially horizontal position. Such machine M is provided with a saddle 24 which rests on top of the pipe, being secured in position by a releasable clamp including a chain and spring assembly 26. Mounted on one end of the saddle 24 is a horseshoe guide member 28 on which a similarly shaped "ring" gear 30 is adapted to rotate. The ring gear 30 is driven by a motor 32 through a coupling 34, a chain 36, and pinions 38, which mesh with the ring gear 30 on opposite sides of the upper quadrant thereof. Such mounting is similar to that disclosed in application Serial No. 5,465, filed January 29, 1960 by Ross et al.

Mounted on the ring gear for rotation therewith by the motor 32, is a sigma welding unit 40. Such unit is provided with a mechanism 42 for adjusting the same radially with respect to the pipe 22, and with an oscillating mechanism 44 which is also adjustable, those parts being carried by a bracket 48 which is bolted at 45 to the ring gear 30. The oscillating mechanism 42 is driven by a motor 46, the speed of which is adjustable to vary the oscillation frequency. Such motor 46 is mounted on the back of the casing containing oscillating mechanism 44.

The drive motor 32 is mounted on a control box 58 on the stationary part of the machine M. The circuit in the control box is connected by a flexible cable 60 to a circuit in a relay box 62, the front panel of which is provided with a welding voltage meter 64 and a welding current meter 66.

The front panel of the control box 58 is provided with a push button switch 68, an "oscillating" switch 70, a wire-feed push button switch 72, a weld start switch 74, a pilot light 76 to indicate when the weld start switch 74 is closed, and a weld pass-rotation switch 78 for controlling the direction of rotation of the sigma welding unit 40.

Lateral adjustment of the upper part of the machine M with respect to the saddle 24 is obtained by means including a knob 80 which controls the position of a platform 82 longitudinally of the pipe with respect to such saddle which is clamped on the pipe. Such mechanism includes horizontal guides and a screw and nut arrangement, the latter being operated by turning knob 80.

The sigma welding unit 40 includes a sigma welding torch 84 through which an electrode wire 86 is fed radially toward the pipe 22 during the welding operation, by suitable feed means including a drive motor 88. Wire for the electrode is drawn from a reel 90 carried by the sigma welding unit by suitable feed rolls 92 which also advances the wire through a contact-guide tube 94 in the torch 84. Welding current is conducted to the wire electrode 86 by the contact-guide tube 94 as the wire moves therefrom. At the same time gas for shielding the welding arc which is energized between the end of the wire electrode 86 and the work 22 is discharged from the torch 84 through a hose to nozzle 96 mounted on the outlet end 84. The sigma welding unit 40 is provided with a removable cover 100 that is provided with a window 102, and held in place by suitable means including a nut 103.

The sigma welding unit 40 per se is connected to the mechanism 42 by a vertically movable slide 104. Such slide is adjusted by means including a worm screw 106 connected by a crown gear 108 to a horizontal stub shaft 110 of a hand crank 112. The worm screw 106 is connected to the slide 104 by a threaded bore 113 which meshes with the screw 106.

The sigma welding unit 40 is pivotally connected to the slide 104 by a bolt 114 which extends through a bearing plate 116 which can be turned about the axis of the bolt 114 and with respect to the slide 104; being held in the proper welding position by a spring pressed detent 117 which cooperates with a corresponding recess in the slide 104. Thus, the sigma welding unit 40 may be tilted for service and inspection of the torch 84 by simply tilting it with sufficient force to unseat the detent 117.

The mechanism 42 on which the sigma welding unit is so mounted, is carried by the outer ends of parallel rods 118 of the oscillating mechanism 44. The rods 118 are supported by and slide in bearings 120 and 121, provided therefor in the casing of the oscillating mechanism. The sigma welding unit 40 is urged toward the bracket 46 by compression springs 122 which surround the rods 118 between the bearings 120 and a common cross-head or yoke 124. Such cross-head is attached to the rods 118, and to a cam follower 126 by a pin 128 and ball bearings 130. The cam follower 126 is operatively associated with a three-dimensional cam 132 which preferably is composed of plastic containing metal filler, but may be of any other suitable material.

Such cam 132 is connected to an end member 134 provided with an annular groove in which fingers 136, 136 extend from the opposite tines of a fork 138, the base of which is pivoted to a shaft 140 of a manual crank 142. Such crank 142 is provided with a spring loaded pin 144 for cooperation with a serrated arcuate member 146 which is mounted on the top of the casing containing the oscillating mechanism 44. Thus, adjustment of the hand crank 142 is used to set the amplitude of oscillation of the sigma welding unit 40 by shifting the cam 132 longitudinally on its axis of rotation, since the position of the cam follower 126 is relatively fixed horizontally with respect to such axis. The cam 132 is driven by motor 46 through the flexible cable 48 which rotates shaft 148 that is longitudinally splined to the side of the cam 132. This permits adjustment of the cam longitudinally of such shaft without interfering with the driving relation of such cam with motor 46.

The three-dimensional cam 132 is critically shaped to produce a delay in the transverse movement of the welding unit 40 of between 60° and 150° (of cam revolution) when the welding wire 82 is at either side of the joint being welded. The selected amplitude of such transverse movement falls between the minimum amplitude and the maximum amplitude, respectively, of the cam 132, depending on the adjustment of the hand crank 142. As shown in FIG. 8, the novel shape of cam 132 actuates the cam follower and with it the sigma welding unit 40, so that the constantly fed wire electrode 86 oscillates along with the welding arc back and forth across the joint being welded along a path 150 which delays for 100° of each cam revolution at each side of the joint as the welding operation progresses downwardly from the 12 o'clock position to the 6 o'clock position. FIG. 9 shows how the constantly fed wire electrode 86 moves from one side of the joint to the other in making a root pass in the open joint between the pipe sections. The resulting root pass is shown at 152 in FIG. 13.

As shown in FIG. 15, the electrical circuit for energizing and controlling the rotation motor 32 and the oscillation motor 46 includes a constant speed fly-ball governor circuit 154 for the motor 32, and a similar circuit 156 for the motor 46, the selected speed of each motor being normally adjusted by means including a knob 158 and 160, respectively, FIG. 1. The field windings of the series motors 32 and 46 are indicated at 162 and 164, respectively, on FIG. 15. Triple-pole double-throw switch 78 and double-pole double-throw switch 70 are provided to control the energization, as well as the direction of rotation of the motors 32 and 46, when the weld start switch 74 is closed, energizing pilot light 76. Rotation limit switches 170 and 172 are located between the stationary and rotary parts of the machine to open automatically to de-energize motor 32 and stop rotation of the welding unit to prevent damage to the cable. By-pass switch 68 is normally open, as shown. Such switch is closed to permit rotation of the welding unit 40 free of the normal control system.

The electrical system relating to the electrode wire feed motor, the control relays and welding circuit are disclosed in the other application and since they do not form part of the present invention, further description is considered unnecessary.

The pieces of pipe 22 are first tack-welded together at 12 and 6 o'clock. The welding pass sequence then is as follows: Root pass started at the 12 o'clock position, proceeding counter-clockwise to 6 o'clock—stop and extinguish arc—return to 12 o'clock position—continue root pass clock-wise from 12 o'clock position—stop and extinguish arc. The succeeding passes are staggered around the 12 o'clock position in such downhand technique to produce a smooth weld bead.

Oscillation of the welding head according to the invention is of prime importance. By oscillating the welding head and the welding electrode and consequently the electric welding arc over a suitable distance transversely across the joint at a critical preselected rate, about the weld center line, with critical dwells at either side, a high (code) quality weld is accomplished.

Our oscillating technique when compared to the prior stringer bead technique produces a wider and larger molten weld puddle. As the arc traverses the puddle width, penetration into the base metal and consequently complete fusion is assured for the full width, and puddle control by means of arc force is possible. Fewer passes are required to fill the joint, resulting in fewer interfaces of previously deposited or parent metal to be melted, and the possibility of lack of fusion is greatly reduced.

Our novel dwell-oscillating arc improves weld puddle control and permits the use of higher welding currents. Higher welding currents result in more complete fusion between all weld passes and the base metal assuring a higher quality of weld.

The control of the molten weld puddle is most important in the vertical or overhead positions of the pipe. The molten weld puddle must be held behind the arc so that the heat of the arc is directed on the solid metal to be melted. With prior stringer bead technique, lower current levels must be maintained to permit such weld puddle control. Higher currents with stringer bead technique may result in the molten puddle dropping from the pipe surface particularly between the 4 and 8 o'clock positions.

A further advantage of our dwell-oscillating technique is in the elimination of non-metallic inclusions. The traversing arc plays directly on non-metallic substances deposited on the surface of previous passes and cause them to melt. The larger molten puddle allows sufficient time before its solidification for such molten substances to float to the surface of the weld. If the arc does not play directly on such foreign substances, as can occur in the stringer bead technique, they may not be melted and will be entrapped as non-metallic inclusions.

The process does not rely on the use of backing tools or rings when making the root pass. At the level of current required to gain complete penetration and fusion of the root pass, burn-through is difficult to prevent if the arc is not oscillated. The oscillating arc, with the amplitude adjusted within the range 1/8" to 5/32" greatly reduces the tendency to burn-through by directing the arc alternately on each edge of the parent metal and not centrally in the root gap. Complete fusion is obtained and the width of the fusion zone is much greater than in a non-oscillated root pass.

To produce the best X-ray quality of welds and avoid any tendency to undercutting on either side of the weld, the preselected critical pause at either extremity of the oscillation increases the weld metal deposit at the weld edges and avoids any tendency toward undercutting, particularly in the overhead position. While this motion must be used for the cover pass, its use with preceding passes is especially advantageous as it tends to produce flatter bead contours, which lead to a more stable arc condition with less spatter in depositing subsequent passes. A lack of delay when the electrode reverses direction at each weld edge, previously resulted in undercutting at both sides of the weld, particularly in the overhead position.

Another advantage of our novel oscillating technique is in the appearance and geometry of the cover pass deposit. Its appearance is uniform with a slight rounded contour and its geometry is such that no stress raising notches are present, as is sometimes encountered with the prior stringer bead technique.

Sigma welding of carbon steel pipe is one with a short-circuiting type arc rather than the spray type arc and is disclosed in the other application and reference is made thereto.

The oscillation speed of motor 46 adjusted by means of a rheostat that is controlled by knob 160, FIG. 1. This adjustment can be made during the welding cycle, or when the machine is at rest. Various cams can be used depending upon the amplitude and delay desired at the outside of the weld. The delay, stated in degrees of rotation of the cam, may be widely varied.

Excellent welds have been obtained with this process. They are well fused and without undesirable slag inclusion, burn-throughs, cold laps, undercut, excessive reinforcement or other defects associated with poor welds.

The machine can weld Schedule-40 steel pipe in two (FIG. 11) or three (FIG. 12) passes, whereas the prior manual method required four passes with slag cleaning between each pass.

FIG. 14, taken in conjunction with FIGS. 11–13, and FIG. 10, discloses preferred welding conditions, according to the invention, for various passes in welding pipe of the different wall thickness. In each case the passes are all made downwardly from 12 to 6 o'clock, as shown.

What we claim is:

1. Welding torch oscillator unit comprising a casing having slide bearings in opposite walls thereof, a torch supporting frame outside of said casing, a thrust rod rigidly connected to said frame and slidably mounted in said bearings, a motor secured to said casing, a cam drive shaft journaled in said casing and driven by said motor, and mechanism inside said casing and actuated by rotation of said shaft for reciprocating said thrust rod in said slide bearings, said mechanism including a cam on said shaft and driven thereby, said cam having a shape such that the entire longitudinal axis of said torch oscillates across a welding path but dwells at a selected angle of cam revolution at either side thereof.

2. Welding torch oscillator unit comprising a casing having slide bearings in opposite walls thereof, a torch supporting frame having a pair of parallel thrust rods rigidly connected together outside of said casing and mounted in said slide bearings for longitudinal reciprocation, a motor secured to said casing, a cam drive shaft journaled in said casing and driven by said motor, and driving mechanism inside said casing for imparting such reciprocation to such rods sliding in said bearings, said mechanism including a cam on said shaft and driven thereby, said cam having a shape such that the entire longitudinal axis of said torch oscillates across a welding path but dwells at a selected angle of cam revolution at either side thereof.

3. Welding torch oscillator unit comprising a casing having slide bearings in opposite walls thereof, a torch supporting frame having a pair of parallel thrust rods rigidly connected together and mounted in said slide bearings for longitudinal reciprocation, a yoke inside said casing connecting said thrust rods, a motor secured to said casing, a cam shaft journaled in said casing and driven by said motor, and mechanism inside said casing and driven by said shaft for imparting reciprocating movement to said cross head, said mechanism including a cam on said shaft and driven thereby, said cam having a shape such that the electrode of said torch oscillates rapidly across a welding joint but dwells at a selected angle of between 60° and 150° of cam revolution at either side thereof, whereby good side-wall fusion is assured.

4. Welding torch oscillator unit comprising a casing having slide bearings in opposite walls thereof, a torch supporting frame having a pair of parallel thrust rods rigidly connected together outside of said casing and mounted in said slide bearings for longitudinal reciprocation, a yoke rigidly connecting said rods inside said casing, a cam shaft journaled in said casing, a motor secured to the outside of the casing wall driving said cam shaft, driving mechanism for said thrust rods comprising a cam on said cam shaft and a follower engaging said cam, said cam having a shape such that the entire longitudinal axis of said torch oscillates, across a welding path but dwells at a selected angle of cam revolution at either side thereof, a hand crank pivoted outside of said casing, and adjusting mechanism connected to said hand crank and extending through the casing wall in the inside of said casing and engaging said driving mechanism for setting the amplitude of reciprocation of said cross head.

5. A welding torch oscillator as in claim 3 wherein compression springs are mounted on said thrust rods for urging said torch supporting frame towards said casing, and wherein said mechanism for imparting reciprocating movement including a three-dimensional cam and a cam follower engaging said cam, end members on said cam having annular grooves, a fork in said casing having fingers extending inwardly from opposite turns of said fork for engaging said annular grooves, and a manual crank connected to the base of said fork whereby the cam can be shifted longitudinally on its axis of rotation thereby setting the amplitude of reciprocation of the torch supporting frame.

References Cited by the Examiner

UNITED STATES PATENTS

| | | | |
|---|---|---|---|
| 1,718,894 | 6/1929 | Bryant | 74—55 |
| 2,249,656 | 7/1941 | Huband | 74—568 |
| 2,490,119 | 12/1949 | Edinger | 226—23 |
| 2,532,320 | 12/1950 | Maussnest | 74—55 X |
| 2,609,157 | 9/1952 | Asmussen et al. | 74—564 X |
| 2,622,445 | 12/1952 | Benedict | 74—50 |
| 2,726,616 | 12/1955 | Downing | 228—27 X |
| 2,970,485 | 2/1961 | Frank | 74—55 |

FRED C. MATTERN, Jr., *Primary Examiner.*

MILTON KAUFMAN, *Examiner.*

F. E. BAKER, H. C. COE, *Assistant Examiners.*